United States Patent [19]

Chandley

[11] Patent Number: 5,340,419
[45] Date of Patent: Aug. 23, 1994

[54] METHOD AND APPARATUS FOR DENSIFYING AN ARTICLE

[75] Inventor: George D. Chandley, Amherst, N.H.

[73] Assignee: Metal Casting Technology, Inc., Milford, N.H.

[21] Appl. No.: 994,878

[22] Filed: Dec. 21, 1992

[51] Int. Cl.$^5$ .............................................. B22F 3/00
[52] U.S. Cl. .................................... 148/631; 266/251; 148/636
[58] Field of Search ............... 266/249, 251; 148/516, 148/631, 636, 645; 419/49, 68

[56] References Cited

U.S. PATENT DOCUMENTS

Re. 28,301   1/1975   Havel ...................................... 419/49
3,577,635   5/1971   Bergman et al. ........................ 419/49

OTHER PUBLICATIONS

The Ceracon Process literature, 4 pages, Dec. 1991.

Primary Examiner—Scott Kastler
Attorney, Agent, or Firm—Flynn, Thiel, Boutell & Tanis

[57] ABSTRACT

Method and apparatus for densifying an article wherein the article is disposed in a first molten salt pressure transmission medium in a container. The first medium is heated to a first elevated densifying temperature. The container is disposed in a second molten salt pressure transmission medium at a second temperature lower than the first temperature. The first medium and the second medium are communicated so that pressure applied to the second medium is transmitted to the first medium. Pressure is applied to the lower temperature second medium sufficient to densify the article disposed in the first higher temperature medium. Following densification of the article, the container is removed from the second medium. The method and apparatus are especially useful for closing internal porosity of metallic and intermetallic castings.

25 Claims, 3 Drawing Sheets

METHOD AND APPARATUS FOR DENSIFYING AN ARTICLE

FIELD OF THE INVENTION

The present invention relates to a method and apparatus for densifying an article and, more particularly, to the hot isostatic pressing of articles, such as metallic and intermetallic castings, to close internal porosity and improve mechanical properties.

BACKGROUND OF THE INVENTION

Hot isostatic pressing (HIP) is a widely used technique for treating articles containing internal porosity to close the porosity and thus densify the article. In particular, HIP'ing is widely used in the casting industry to treat metal castings to close internal porosity and improve metallurgical structure and mechanical properties.

HIP'ing involves subjecting a casting or other article to elevated temperature and elevated gas pressure, such as argon gas pressure, for an appropriate time at temperature and pressure to achieve a metallurgical structure free of internal porosity. Equipment for conducting HIP'ing operations using high inert gas pressure is extremely expensive. Moreover, such HIP'ing equipment involves long cycle times in order to raise both temperature and pressure to the elevated levels needed as well as lower them after article consolidation is complete. As a result, although in widespread use to produce improved castings, HIP'ing adds considerably to the cost of the castings.

An alternative process that attempts to emulate HIP'ing conditions has been developed and marketed as the CERACON process to hot press metallic, intermetallic, and ceramic products. This process involves placing a preheated article in a die cavity, filling the die cavity with preheated ceramic grain or particulates, and advancing a hydraulically driven ram into the die cavity to press the particulates about the article. In this process, the particulates apply only a pseudo-isostatic pressure to the article to be densified. Moreover, this process cannot be used to treat very reactive materials, such as reactive metals (e.g. Ti and its alloys) and intermetallics (e.g. TiAl) without enclosing the article in a protective container or conducting the pressing operation in vacuum or inert gas.

There is a need for a method and apparatus for densifying articles under elevated temperature and purely isostatic elevated pressure conditions yet at lower cost than the previously used HIP process that relied on inert gas pressure.

It is an object of the invention to satisfy this need.

SUMMARY OF THE INVENTION

The present invention involves a method of densifying an article, such as, for example, a metallic or intermetallic casting, wherein the article is disposed in a first liquid pressure transmission medium, such as preferably a molten salt, in a container. The first medium is heated to a first elevated article-densifying temperature. The container is disposed in a second liquid pressure transmission medium, such as a molten salt, at a second temperature lower than the first temperature. The first medium and the second medium are communicated so that pressure applied to the second medium is transmitted to the first medium. Pressure is applied to the lower temperature second medium sufficient to densify the article disposed in the higher temperature first medium. Following densification of the article, the container is removed from the second medium.

In one embodiment of the invention, the lower temperature second medium is disposed in a second container and pressure is applied to the second medium by a piston advanced into the second container to engage the second medium. The pressure applied to the second medium is transmitted to the higher temperature first medium for application in isostatic manner to the article in the first medium.

The present invention also involves apparatus for densifying an article wherein the apparatus includes a first container for a first liquid pressure transmission medium, such as a molten salt, in which the article is disposed for densification at a first elevated temperature. The first container is disposed in a second container holding a second pressure transmission medium, such as a molten salt, at a lower temperature so that the first medium and the second medium are communicated and pressure applied to the second medium is transmitted to the first medium. Means is provided for applying pressure to the lower temperature second medium in the second container sufficient to densify the article disposed in the higher temperature first medium in the first container.

In one embodiment of the invention, the first medium and the second medium are communicated by an opening in the first container.

In another embodiment of the invention, the means for applying the pressure to the lower temperature second medium comprises a piston for engaging the second medium in the second container.

In practicing the present invention, the pressure applied to the article in the first medium is isostatic in nature so that uniform pressure is applied to the article from all directions. The use of the liquid pressure transmission mediums in the manner described provides a relatively low cost, short cycle time hot isostatic pressing process for densifying articles of manufacture, such a metallic and intermetallic castings. Moreover, the article is densified or consolidated in the first medium which can be selected to prevent oxidation of the article.

For castings requiring low pressing temperatures (e.g. 1000° F. for Al castings), the same molten salt can be used for the aforementioned first and second pressure transmission mediums.

Other objects and advantages of the present invention will become apparent from the following detailed description and drawings.

DETAILED DESCRIPTION OF THE INVENTION

Figure 1:
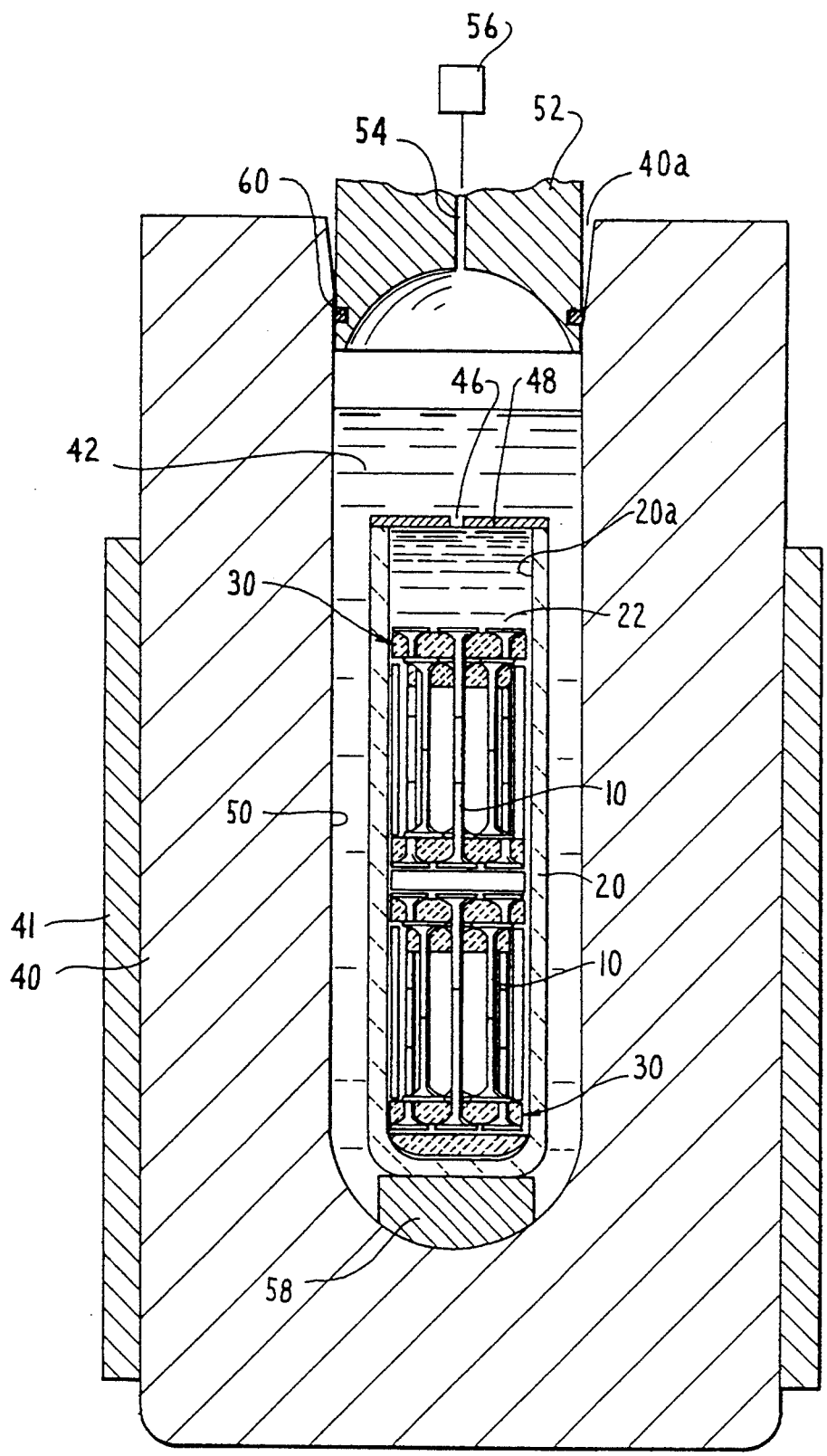
FIG. 1 is a cross-sectional view of apparatus in accordance with one embodiment of the invention for practicing a method embodiment of the invention.

FIG. 1 illustrates apparatus in accordance with one embodiment of the invention for densifying or consolidating a plurality of articles illustrated as cast internal combustion engine valves 10 in accordance with a method embodiment of the invention. The valves 10 can be investment cast 50 atomic % Ti-50 atomic % Al exhaust valves of an internal combustion engine. The intermetallic valves include a valve stem 10a and a valve head 10b in usual manner, FIG. 2. However, the invention is not limited to densifying engine valves and can be used to densify any article. Moreover, the invention is not limited to densifying intermetallic articles and can be practiced to densify articles comprising metallic, intermetallic, ceramic, and other materials. The densification of TiAl intermetallic internal combustion engine valves 10 is offered merely for purposes of illustration and not limitation.

The apparatus is shown comprising a first inner, ceramic container 20 having a cylindrical chamber 20a for holding a first liquid pressure transmission medium 22 in which the valves 10 are positioned for densification. The first pressure transmission medium 22 comprises a molten salt whose composition is selected from high melting point salts to provide a stable melting point above a first elevated temperature for densifying the valves 10 under pressure. For example, for densifying the aforementioned TiAl valves 10, the high temperature molten salt comprises 100% $BaCl_2$ to provide a stable salt melting point to about 2500° F. so that the valves 10 can be densified at a densifying temperature of about 2300° F.; i.e. valves 10 and medium 22 are at 2300° F.

The valves 10 may be positioned on a suitable fixture such as fixture 30 comprising lower ceramic (e.g. alumina) support members 32,33 that accommodate ten valves 10. In particular, six valves 10 are circumferentially spaced on the lower member 32 about a central valve 10. Three valves 10 are disposed on the member 33. The member 33 includes appropriate recesses 33a to accommodate the valve heads 10b and vertical openings 33b through which the valve stems 10a extend upwardly as shown best in FIGS. 2-3.

The fixture 30 also includes upper ceramic (e.g. alumina) support members 34,35 also accommodating ten valves 10. Six valves 10 are circumferentially spaced on the upper member 34 about a central valve 10. Three valves 10 are disposed on the lower member 35. The members 34, 35 include appropriate recesses 34a, 35a to accommodate the valve heads 10b and vertical openings 34b, 35b through which the valve stems 10a extend downwardly as shown best in FIGS. 2-3.

The valves 10 on the upper support members 34, 35 are arranged in a like array as the valves on the lower members 32, 33 but angularly displaced so that the upper valves can nest between the lower valves. The upper support members 34, 35 are supported above the lower support member 32, 33 by three upstanding posts 36 (two shown) spaced 120° apart therebetween. The fixture components described above and the valves 10 are maintained assembled together by gravity without fasteners and the like.

As shown in FIG. 1, a plurality (two shown) of the fixtures 30 can be disposed one atop the other in the chamber 20a of the first container 20. As illustrated, a total of forty valves 10 can be densified in the apparatus of FIG. 1 using two fixtures 30, each supporting twenty valves 10 thereon.

The apparatus includes a second metal container 40 holding a second pressure transmission medium 42 at a second temperature lower than the first temperature, i.e. lower than the temperature of the molten salt 22 in the first container 20. The second medium comprises a molten salt whose composition is selected from low and high melting point salts to provide the desired lower temperature. For densifying the aforementioned TiAl valves 10, the molten salt comprises a mixture of $BaCl_2$ $CaCl_2$, and NaCl in proportions (e.g. 35 weight % $BaCl_2$, 45 weight % $CaCl_2$, and 20 weight % NaCl) to provide a stable salt melting point to about 850° F. so that the valves 10 can be densified when the medium 42 is at a minimum temperature of 1000° F.

As shown best in FIG. 1, the first container 20 includes a top closure plate 48 for communicating the first medium (first molten salt) 22 and the second medium (second molten salt) 42 such that pressure applied to the second medium 42 is transmitted to the first medium 22. The communication can be effected by a hole or opening, such as aperture 46, that is limited in size (e.g. ½ inch diameter) to avoid undue intermingling of the high temperature molten salt in container 20 and the lower temperature molten salt in container 40 during the pressing operation. The top closure plate 48 can also be porous ceramic fiber material, which will allow fluid pressure to be transmitted therethrough. The top closure plate 48 is supported on the container 20 by gravity.

The second container 40 is shown as a metal die having a cylindrical die cavity 50 in which the first container 20 is disposed. The die 40 includes an open top end 40a which receives a piston or ram 52 of a hydraulic or similar press; e.g. the piston of 500 ton conventional hydraulic press. A peripheral sealing member 60 (made of cobalt alloy 3) is disposed about the piston 52 between the piston and die and typically is capable of withstanding 25000 psi during the pressing operation to be described. The container or die 40 is supported on the bed (not shown) of the hydraulic press, or alternately can be bolted on a suitable support frame.

The piston 52 comprises means for applying pressure to the second medium 42 which is transmitted to the first medium 22 in the first container 20 via the opening 46. The pressure applied by the piston 52 is selected sufficient at the pressing temperature involved to densify the valves 10 disposed in the first medium 22 in the first container 20. The piston 52 includes a vent passage 54 to ambient so that air inside the die cavity 50 can escape when the piston 52 is initially advanced into the die cavity. The vent passage 54 is closed by an air vent valve 56 (shown schematically) on the piston 52 after the air is vented.

In the apparatus of FIG. 1 illustrated for densifying the forty cast TiAl valves 10 on fixtures 30, the container or die 40 is made of a suitable nickel base superalloy, such as IN 718, and has an outer diameter of 19 inches and height of 34 inches. The die 40 is subjected to a maximum hoop stress of about 66000 psi during the pressing operation. The die cavity 50 has an inner diameter of 7 inches and a height of 24 inches. The ceramic container 20 is made of alumina and has an outer diameter of 5 inches and a height of 18 inches. The chamber 20a has an inner diameter of 4 inches and a height of 17.5 inches. The container 20 rests on a metal (e.g. IN 718) pedestal 58 at the bottom of the die cavity 50. The piston 52 is made of type 440 stainless steel and has an outer diameter of about 6.99 inches.

Figure 2:
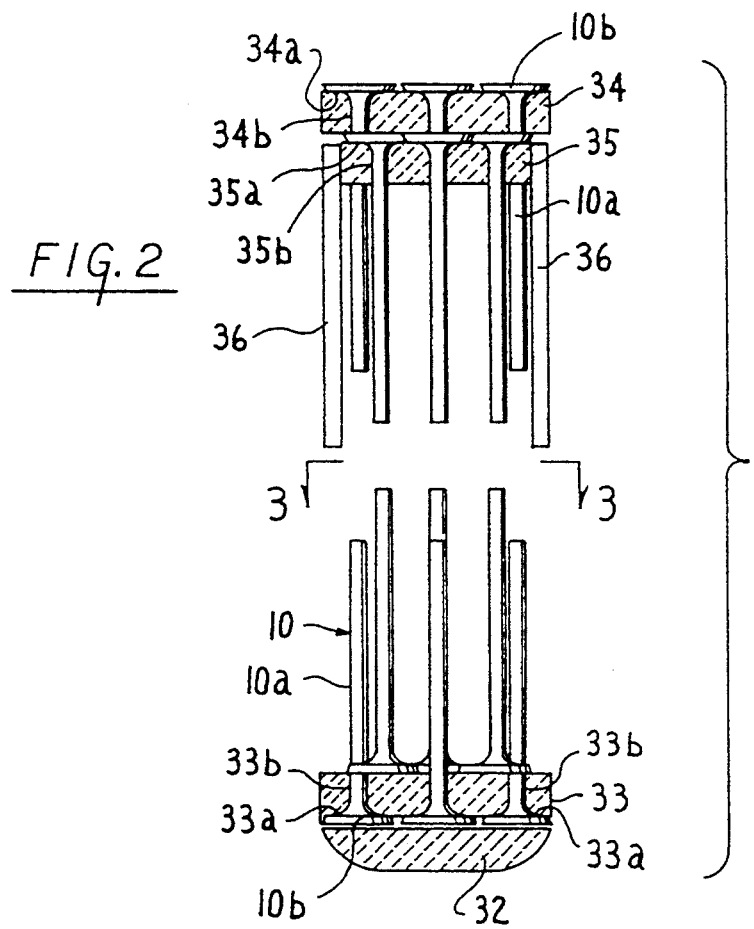
FIG. 2 is a cross-sectional view of casting support or fixture for holding the castings to be densified.
Figure 3:
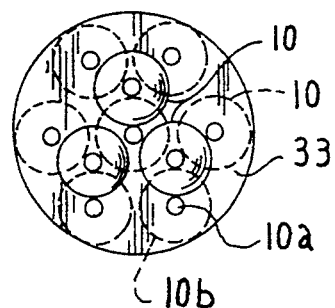
FIG. 3 is a view of the casting fixture taken along line 3—3 of FIG. 2.

In practicing a method embodiment of the invention for densifying the cast TiAl valves 10, the valves 10 are first placed on the fixtures 30 as shown in FIGS. 2–3. The fixtures 30 are loaded into the ceramic container 20. Molten $BaCl_2$ salt is introduced into the container 20 about the fixtures 30. The top plate 48 is then placed on the container. The container is then placed in a suitable heating device (not shown), such as molten salt bath heater, and heated to the desired isostatic pressing temperature. A molten salt pressing temperature of 2300° F. is used in one embodiment of the invention for isostatic pressing of the cast TiAl valves 10 described above. Of course, different isostatic pressing temperatures will be used in the event the valves 10 are made of other materials. Pressing temperatures in the range of 600° to 2500° F. may be used depending upon the material to be pressed.

The heated container 20 housing the molten salt medium 22 and valves 10 on fixtures 30 is placed in the molten salt medium 22 in the die cavity 50 that has been preheated (by a band electrical resistance heating device 41 shown schematically) to provide a suitable temperature molten salt medium 42. For densifying the cast TiAl valves 10 in the molten salt medium 22 at 2300° F., the molten salt medium 42 in the die cavity 50 is preheated to 1000° F. minimum.

In particular, a mixture of $BaCl_2$ (35 weight %), $CaCl_2$ (45 weight %) and NaCl (20 weight %) is held in the die cavity 50 and heated by electrical resistance or induction heating device 41 to a minimum of 1000° F. This 1000° F. minimum temperature is used to reduce cooling of the values 10.

After the heated container 20 is placed in the die 40, the piston 52 is immediately lowered or advanced into the die cavity 50 so as to minimize a drop in temperature of the valves in the container 20 before they are subjected to the elevated isostatic pressing pressure. The piston 52 initially is advanced into the die cavity 50 with the vent passage 54 open so that air can be vented from the die cavity. The air vent valve 56 is then closed, and the piston 52 further advanced into engagement with the molten salt medium 42 to apply the desired isostatic pressing pressure. The lower temperature molten salt medium 42 transmits the applied pressure to the higher temperature molten salt medium 22 in the container 20 via the opening 46 (or other pressure transmitting means therebetween) and thus to the valves 10 on the fixtures 30. A typical isostatic pressing pressure for the cast TiAl valves 10 at 2300° F. is about 25000 psi. This pressure is sufficient to close any internal porosity in the cast microstructure of the valves. The isostatic pressure is applied to the valves 10 for only approximately one minute. Of course, for valves 10 (or other articles) made of other materials, the isostatic pressing temperature and pressure and time at temperature/pressure will be different and selected to produce the desired densification or consolidation of the valve (or other articles).

After the valves 10 are isostatically pressed (e.g. after one minute from application of the isostatic pressing pressure), the piston 52 is raised, and the container 20 is removed from the die cavity 50. The hot isostatically pressed valves 10 are removed from the container into an inert gas atmosphere for cooling to ambient or may be allowed to cool to ambient in the container 20 and then removed from the container 20.

Metallographic analysis of cast TiAl valves 10 hot isostatically pressed in the manner described revealed the valves to be free of internal porosity.

Figure 4C:
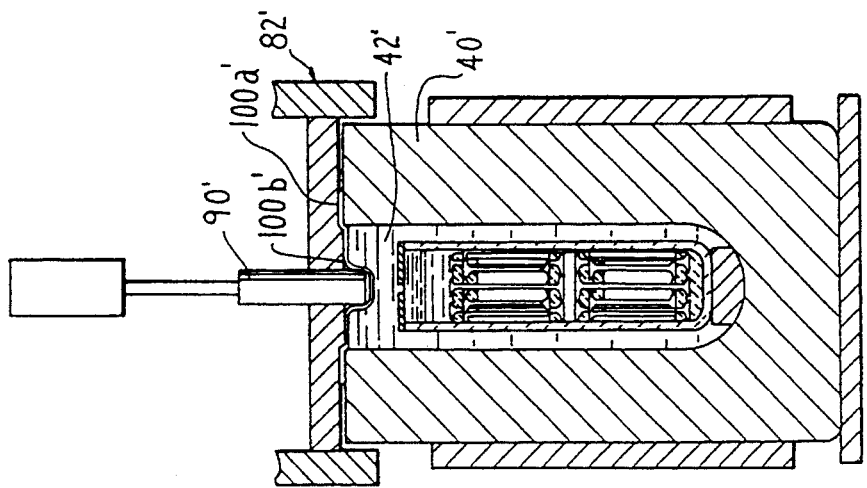
FIGS. 4A, 4B and 4C are cross-sectional views of apparatus in accordance with another embodiment of the invention for practicing a method embodiment of the invention.
Figure 4B:
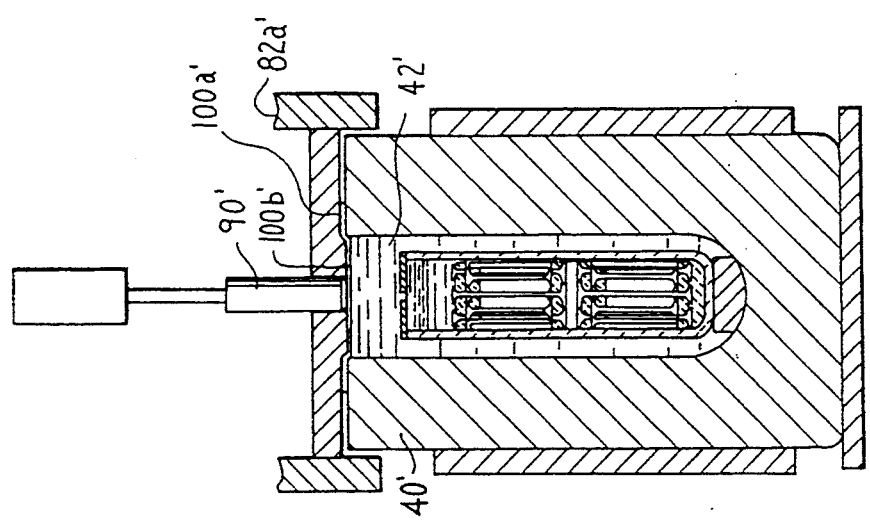
Figure 4A:
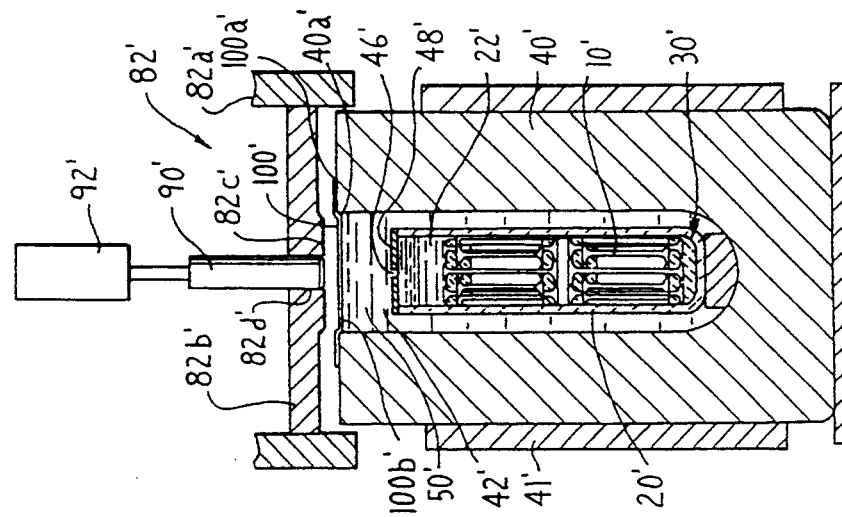

FIGS. 4A, 4B and 4C illustrate apparatus in accordance with another embodiment of the invention. The apparatus is similar to that described hereinabove with respect to FIGS. 1–3 with the exception of the means for applying pressure to the second liquid pressure transmitting medium in the heated die. In FIGS. 4A, 4B and 4C, like reference numerals primed are used to designate like features of FIGS. 1–3.

Referring to FIG. 4A, the first inner, ceramic container 20' having the valves 10' supported on fixtures 30' one atop the other in the high temperature molten salt (first pressure transmission medium 22') is shown disposed in the heated die 40'. Die 40' contains the lower temperature molten salt (second pressure transmission medium 42') about the first container 20' and communicated to the first medium 22' by the opening 46' in the closure plate 48' (or other opening means between the container and die).

The heated die 40' is supported on a lower, fixed frame 80'. An upper, movable frame 82' is positionable atop the die 40'. The upper frame 82' is movable by a crane or upper press platen (not shown). The upper frame 82' includes a peripheral member 82a' and a cross-member 82b' having a projecting nose 82c' and central opening 82d' registered above the chamber 50' of the die 40'. The opening 82d' receives a rod 90' of a hydraulic cylinder 92' mounted on the frame.

Before the frame 82' is positioned over the die 40', a sheet 100' of suitable material, such as a sheet of low carbon 1010 steel having 1/16 inch thickness, is placed on the die 40' so as to overlie the upper die opening 40a' and surface of the second medium 42' as shown in FIG. 4A. The sheet 100' includes a peripheral portion 100a' and central portion 100b' received in the die opening 40a'. A 10 inch diameter sheet 100' is used for a 7 inch diameter die cavity 50'.

The upper frame 82' is then lowered toward the die 40' until the cross-member 82b' engages the upper end of the heated die 40' FIG. 4B. This movement forces air out between the sheet 100' and the chamber 50'. The sheet 100' is trapped at its outer periphery 100a' by the cross-member 82b' while the nose 82c' engages central sheet portion 100b' FIG. 4B. The frames 80', 82' are then bolted or otherwise held together.

After the cross-member 82b' engages the die 40', the cylinder 92' is actuated to move the cylinder rod 90' relative to the cross-member 82b' to push the central portion 100b' of sheet 100' into the second medium 42' to apply the desired pressing pressure to the first medium 22' in the container 20' via the second medium 42' FIG. 4C. The central sheet portion 100b' is plastically deformed during the pressing operation.

Following isostatic pressing, the cylinder 92' is actuated to raise the rod 90'. The upper frame 82' is then released from frame 80' and raised to allow the sheet 100' to be removed and discarded. The fixtures 30' are then removed from the die 40' to access the HIP'ed valves 10' thereon.

This apparatus embodiment is advantageous over the apparatus shown in FIGS. 1–3 in that a small hydraulic cylinder 92' (e.g. 29000 lb. force) can be used to apply the pressing pressure through a small diameter (e.g. 1¼ inches) cylinder rod 90' thereof and the large-area sheet 100' (e.g. 10 inches diameter sheet for 7 inches diameter die cavity inch) engaged by the rod 90'. The travel of rod 90' needed to generate the pressing pressure is relatively small as a result of this arrangement.

The present invention is advantageous in that purely isostatic pressure is applied to the articles (e.g. valves 10) via the molten salt mediums 22 (22'), 42 (42') without the need for expensive gas pressure equipment. The use of the liquid pressure transmission mediums in the manner described provides a relatively low cost, short cycle time hot isostatic pressing process for densifying articles of manufacture, such a metallic and intermetallic castings. Moreover, the article is densified or consolidated in the first medium which can be selected to prevent oxidation of the article.

For castings, such as Al, requiring low pressing temperatures, e.g. 1000° F. for Al castings, the same molten salt can be used as the pressure transmission mediums 22 (22'), 42 (42') in containers 20 (20'), 40 (40'). That is, the low temperature medium 42 (42') can be introduced into container 20 (20') in lieu of the higher temperature medium 22 (22').

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method of densifying an article, comprising:
    a) disposing a first molten salt pressure transmission medium about said article in a container, said first medium being at a first elevated temperature for densifying said article under pressure,
    b) disposing a second molten salt pressure transmission medium at a second temperature lower than said first temperature about said container such that said first medium and said second medium are communicated so that pressure applied to said second medium is transmitted to said first medium, and
    c) applying pressure to said second medium sufficient to densify said article disposed in said first medium.

2. The method of claim 1 wherein said article is placed in said container and said first medium heated to said elevated temperature is poured about said article in said container.

3. The method of claim 1 wherein said second medium is contained in a heated die and said pressure is applied to said second medium by pressure-applying means moved into said engagement with said second medium.

4. The method of claim 1 wherein pressure is applied to said second medium by a sheet of material overlying said second medium and engaged by a pressure-applying member moved toward said second medium.

5. The method of claim 1 including removing said container from said second medium after said article is densified.

6. A method of densifying a metallic or intermetallic article, comprising:
    a) disposing a first molten salt pressure transmission medium about said article in a container, said first medium being at a first elevated temperature for densifying said article under pressure,
    b) disposing a second molten salt pressure transmission medium at a second temperature lower than said first temperature about said container such that, said first medium and said second medium are communicated so that pressure applied to said second medium is transmitted to said first medium, and
    c) applying pressure to said second medium sufficient to densify said article disposed in said first medium.

7. The method of claim 6 wherein said second medium is contained in a heated die and said pressure is applied to said second medium by pressure-applying means moved into said engagement with said second medium.

8. The method of claim 7 wherein pressure is applied to said second medium by a sheet of material overlying said second medium and engaged by a pressure-applying member moved toward said die.

9. A method of densifying a metallic casting, comprising:
    a) disposing a molten salt about said casting in a container,
    b) disposing a molten salt about said container such that said molten salts are communicated, and
    c) applying pressure to the molten salt disposed about said container sufficient to densify said casting disposed in the molten salt in said container.

10. Apparatus for densifying an article, comprising:
    a) a first container for a molten salt pressure transmission medium in which said article is disposed for densification,
    b) a molten salt pressure transmission medium disposed in said first container,
    c) a second container for a molten salt pressure transmission medium, said first container being disposed in said second container,
    d) a molten salt pressure transmission medium disposed in said second container such that said mediums are communicated so that pressure applied to the medium in said second container is transmitted to the medium in said first container, and
    e) means for applying pressure to the medium in said second container sufficient to densify said article disposed in the medium in said first container.

11. Apparatus for densifying an article, comprising:
    a) a first container for a first molten salt pressure transmission medium in which said article is disposed for densification,
    b) a first molten salt pressure transmission medium disposed in said first container, said first medium being at a first elevated temperature for densifying said article under pressure,
    c) a second container for a second molten salt pressure transmission medium at a second temperature lower than said first temperature, said first container being disposed in said second container,
    d) a second molten salt pressure transmission medium disposed in the second container and having a composition different from that of said first medium, said first medium and said second medium being communicated so that pressure applied to said second medium is transmitted to said first medium, and
    e) means for applying pressure to said second medium in said second container sufficient to density said article disposed in said first medium in said first container.

12. The apparatus of claim 11 including means for communicating said first medium and said second medium wherein said means comprises opening means between said first container and second container.

13. The apparatus of claim 11 wherein said means for applying said pressure comprises a pressure-applying means for engaging said second medium in said second container.

14. The apparatus of claim 13 wherein said means for applying said pressure comprises a sheet of material overlying said second medium and a pressure-applying member movable toward said second container to engage said sheet with said second medium to apply said pressure thereto.

15. The apparatus of claim 14 wherein said sheet comprises a steel sheet and said pressure-applying member comprises a rod of a hydraulic cylinder.

16. The apparatus of claim 11 wherein said first container includes a support on which said article is positioned.

17. A method of densifying material comprising:
  a) disposing a first molten salt pressure transmission medium about said material in a container,
  b) disposing a second molten salt pressure transmission medium in communication with said first molten salt pressure transmission medium such that said first medium and said second medium are communicated so that pressure applied to said second medium is transmitted to said first medium, and
  c) applying pressure to said second medium sufficient to densify said material disposed in said first medium.

18. A method of densifying material, comprising:
  a) disposing a first molten salt pressure transmission medium about the material in a container,
  b) disposing a second molten salt pressure transmission medium about the container such that the first and second pressure transmission mediums are communicated so that pressure applied to the second pressure transmission medium is transmitted to the first pressure transmission medium, and
  c) applying pressure to the second pressure transmission medium sufficient to densify the material disposed in the first pressure transmission medium.

19. The method of claim 18 wherein pressure is applied to the second pressure transmission medium by a sheet of material that is engaged by a movable pressure-applying member.

20. A method of densifying material, comprising:
  a) disposing a molten salt about the material in a container
  b) disposing a molten salt about the container such that said molten salts are communicated, and
  c) applying pressure to the molten salt disposed about said container sufficient to densify the material disposed in the molten salt in said container.

21. The method of claim 20 wherein pressure is applied to the molten salt disposed about said container by a sheet of material that is engaged by a movable pressure-applying member.

22. Apparatus, comprising:
  a) a first container for receiving material to be densified,
  b) molten salt disposed in the first container,
  c) a second container for receiving the first container,
  d) molten salt disposed in the second container and communicated to the molten salt in the first container, and
  e) means for applying pressure to the molten salt disposed in the second container sufficient to densify the material disposed in the molten salt in the first container.

23. The apparatus of claim 22 wherein said means for applying pressure comprises a sheet of material in juxtaposition to the molten salt in the second container and a pressure-applying member movable to engage said sheet with the molten salt in the second container to apply said pressure thereto.

24. The apparatus of claim 23 wherein the molten salt in the second container is communicated to the molten salt in the first container by opening means between the first container and second container.

25. Apparatus comprising a molten salt pressure transmission medium disposed about material to be densified, a sheet member in juxtaposition to the molten salt pressure transmission medium, and a pressure-applying member movable to engage said sheet with said second medium to apply pressure thereto.

* * * * *

UNITED STATES PATENT AND TRADEMARK OFFICE
CERTIFICATE OF CORRECTION

PATENT NO. : 5 340 419  
DATED     : August 23, 1994  
INVENTOR(S) : Chandley

It is certified that error appears in the above-indentified patent and that said Letters Patent is hereby corrected as shown below:

Column 8, line 62; replace "density" with ---densify---.  
Column 10, line 5; after "container" insert ---,---.

Signed and Sealed this

Twenty-first Day of November, 1995

Attest:

BRUCE LEHMAN

Attesting Officer     Commissioner of Patents and Trademarks